Figure 7:
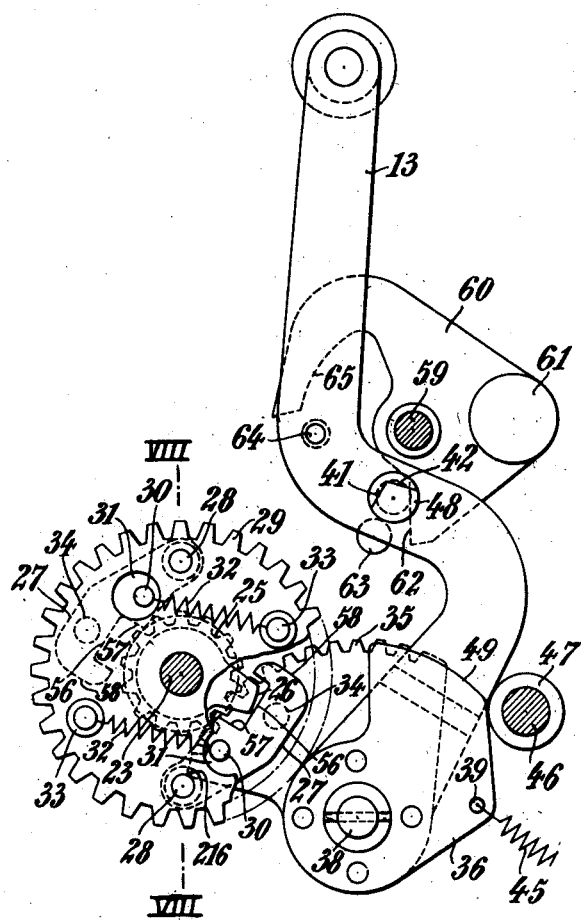

July 5, 1932.   B. BORNKESSEL ET AL   1,865,883
CASH REGISTER
Filed July 13, 1926    8 Sheets-Sheet 1
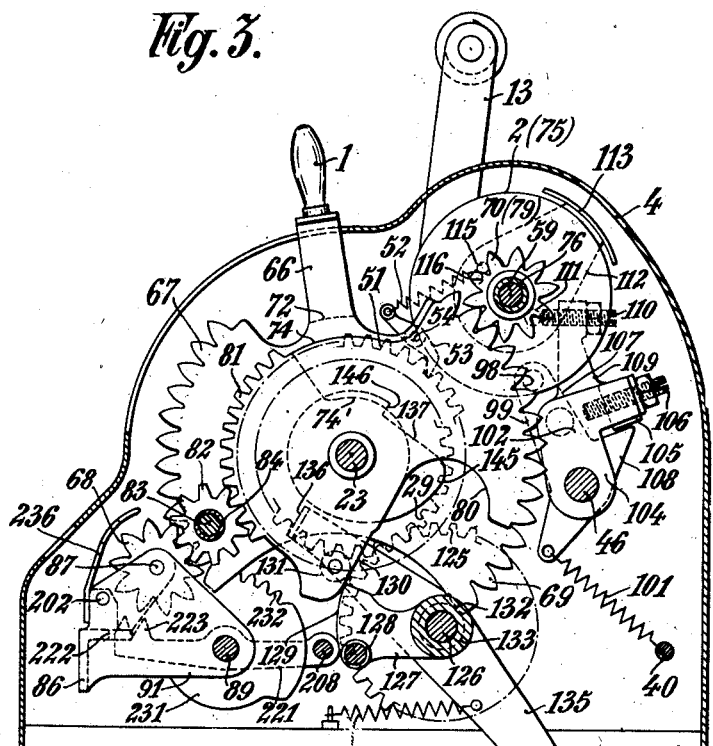
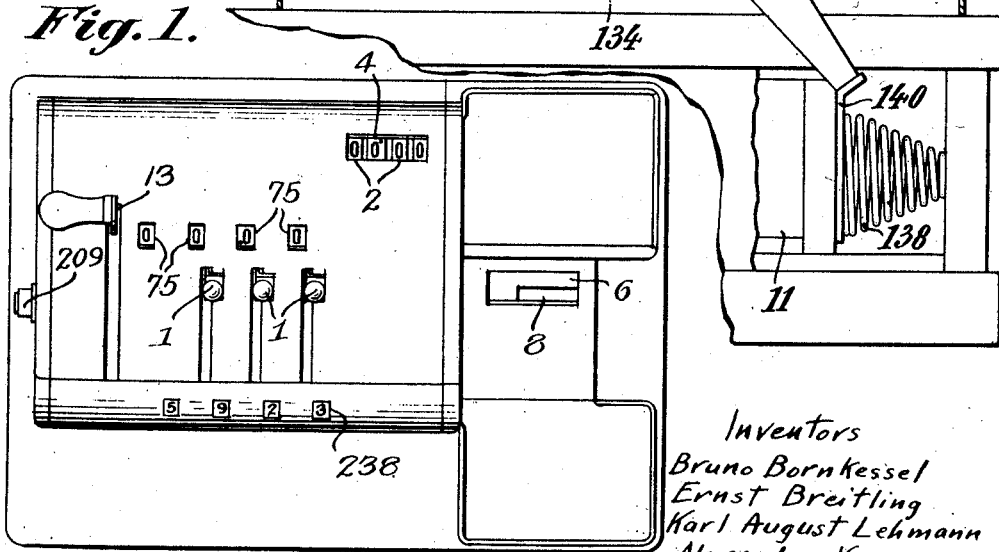
Inventors
Bruno Bornkessel
Ernst Breitling
Karl August Lehmann
Alexander Varren

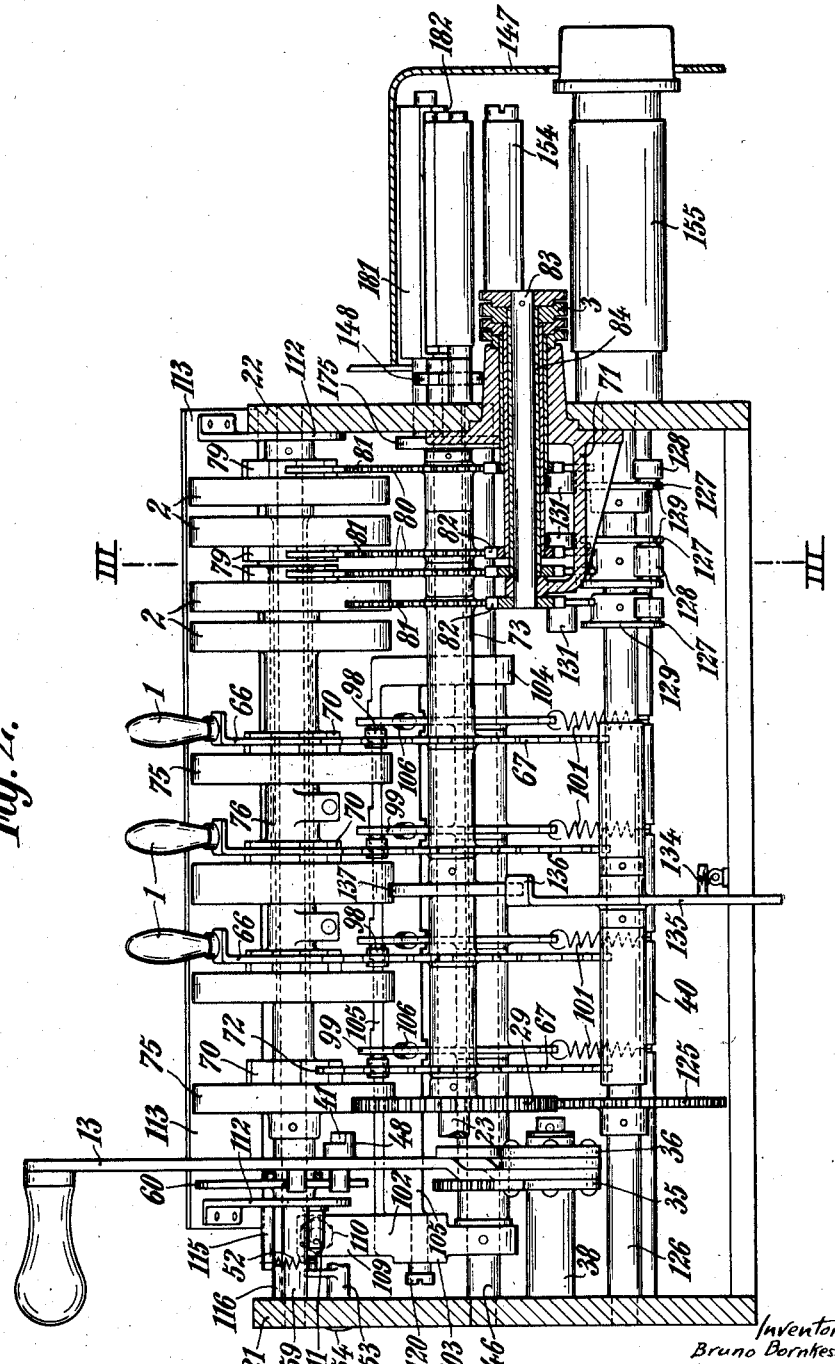

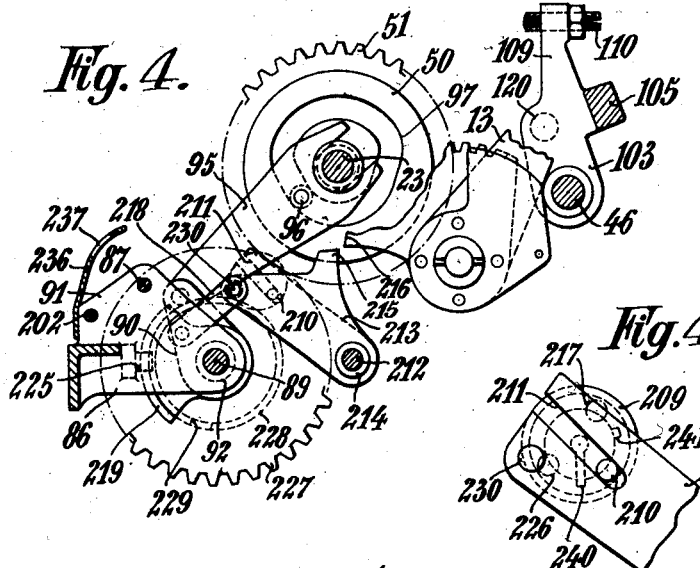
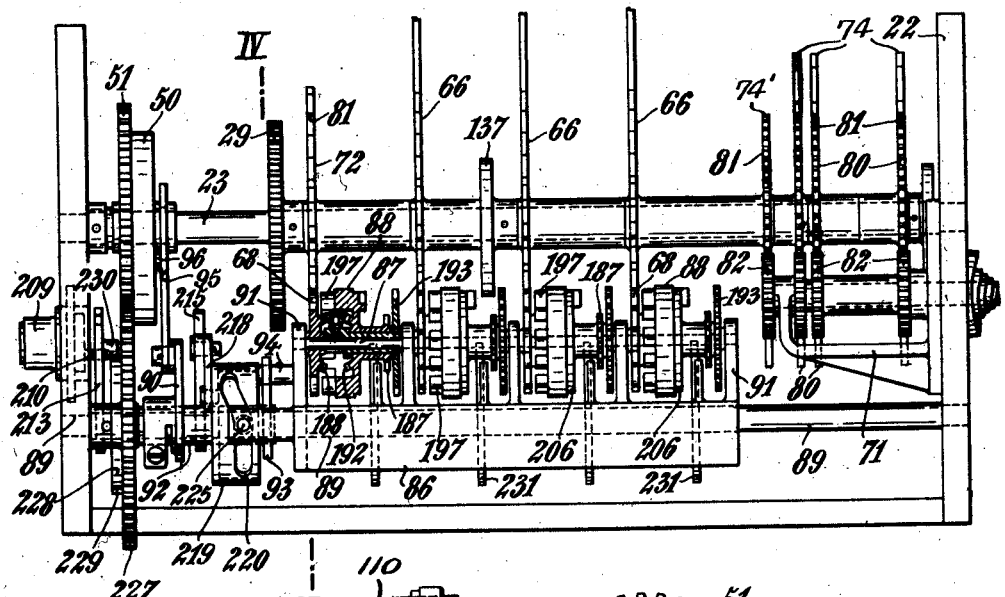
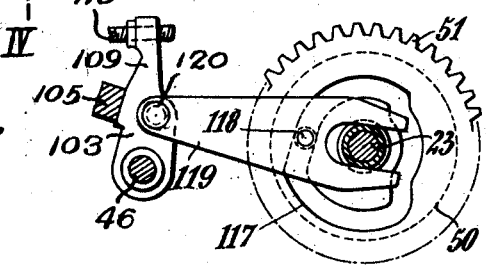

Inventors
Bruno Bornkessel
Ernst Breitling
Karl August Lehmann
Alexander Vorren

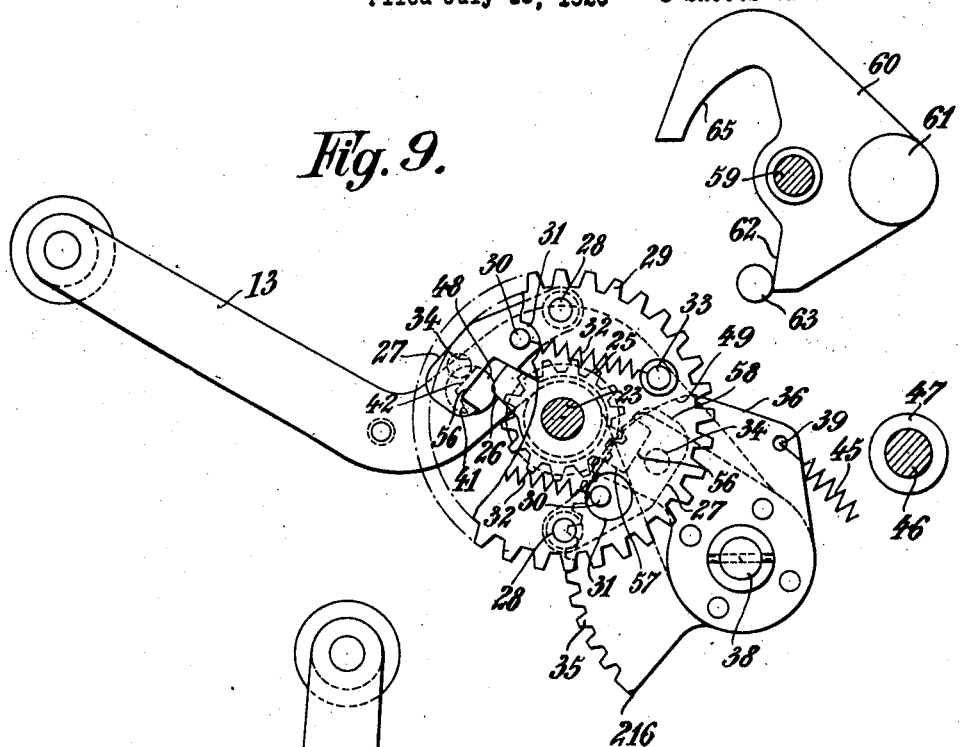
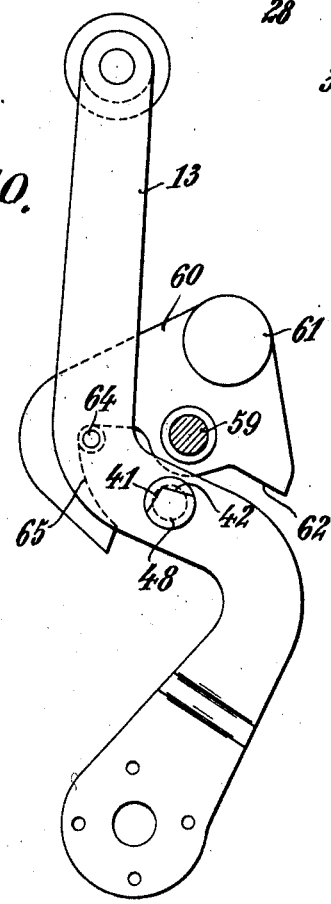
Fig. 9.
Fig. 10.
Inventors
Bruno Bornkessel
Ernst Breitling
Karl August Lehmann
Alexander Varren

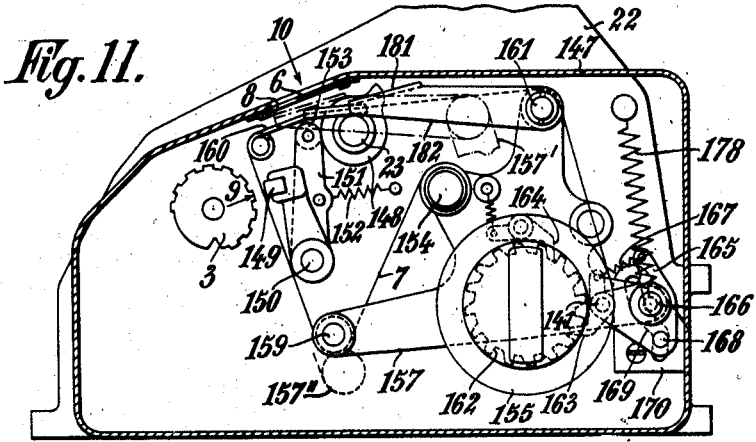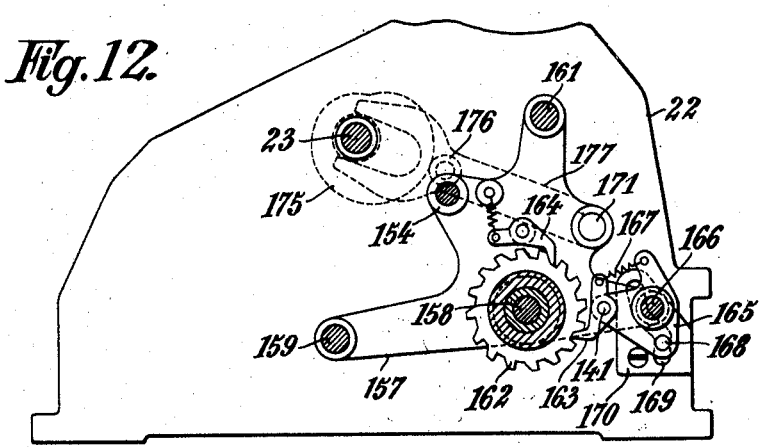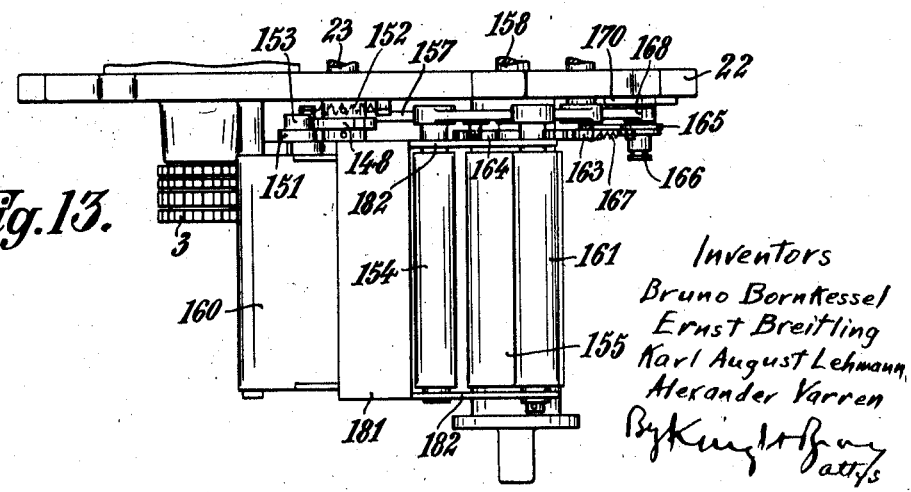

July 5, 1932.   B. BORNKESSEL ET AL   1,865,883
CASH REGISTER
Filed July 13, 1926   8 Sheets-Sheet 7

Inventors
Bruno Bornkessel
Ernst Breitling
Karl August Lehmann
Alexander Varren

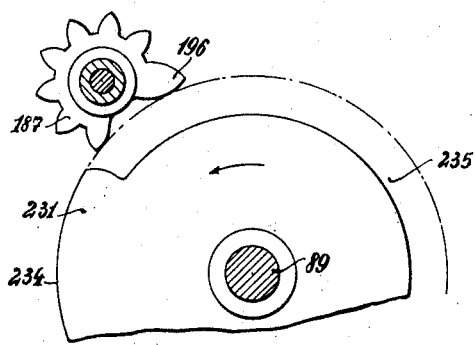
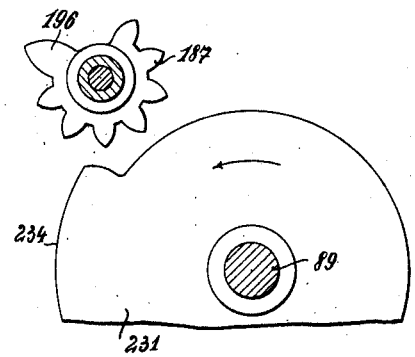
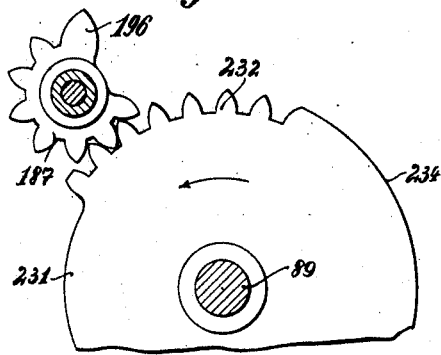
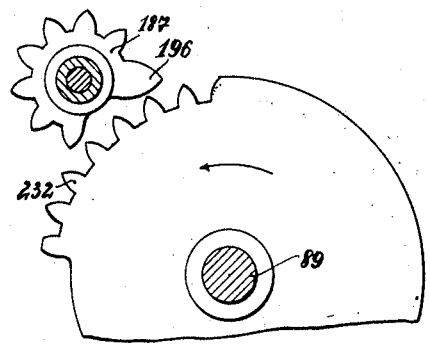
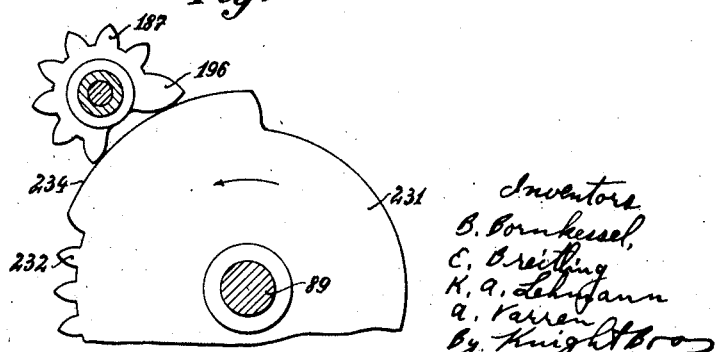

Patented July 5, 1932

1,865,883

UNITED STATES PATENT OFFICE

BRUNO BORNKESSEL, ERNST BREITLING, KARL AUGUST LEHMANN, AND ALEXANDER VARREN, OF ESSEN, GERMANY, ASSIGNORS TO FRIED. KRUPP AKTIENGESELL- SCHAFT, OF ESSEN-ON-THE-RUHR, GERMANY

CASH REGISTER

Application filed July 13, 1926, Serial No. 122,215, and in Germany May 22, 1925.

This invention relates to cash registers with a lever drive and a printing mechanism, and it has more particularly reference to such improvements of these machines which have for their object to increase the simplicity and safety of the attendance and construction of the machines.

According to the invention, the driving movement of the hand lever or crank for the driving mechanism takes place in two periods of time which are separated from each other by the operation of adjusting the setting and differential means. This arrangement which entails a plurality of novel constructive measures for the several mechanisms of the cash register, simplifies the controlling and differential mechanisms and makes them in part dispensable. The machine therefore becomes simpler in construction and cheaper in manufacture.

In the construction of the new cash register special attention has been paid to the mutual arrangement of those mechanisms which take part in the control of the amounts of money paid in and out.

It is of importance for this control that the amount to be paid and the amount actually paid may be directly compared by the seller and the customer and that in doing so the seller is not in any way hindered by operations to be performed at the machine such as, for instance, moving the driving lever or making hand-written remarks on the record strip.

In known arrangements serving similar purposes, the counting board is disposed in close proximity of the indicating wheels for the customer so as to allow the customer to survey simultaneously the amount to be paid and the amount paid. In order to allow also the seller to control unhinderedly the two amounts, there are arranged, according to our invention, in close proximity of the counting board not only the indicating wheels, which are readable by the customer at the back of the machine, but also the inspection opening for the record strip the last line of print of which is made visible at each operation of the machine.

With the record strip feeding device used, the last line of print is made visible by causing the portion of the record strip lying between the winding and unwinding rollers which are arranged in a common frame, to be moved along a fixed guide of the casing by rocking the frame. Novel features of our invention are involved by adapting this feeding device to the type of drive of the new cash register.

Finally, the invention comprises still a special construction of the totalizing mechanism the tens transfer mechanism of which is actuated simultaneously with the setting of the amounts by the hand levers, the construction allowing the impression of the sum contained in the totalizing mechanism to be made in a simple and reliable way without changing the mode of driving the cash register.

With these (and incidental) objects in view, our invention consists in certain novel features of construction and combination of parts, the essential elements of which are set forth in appended claims and a preferred form of embodiment of which is hereinafter described with reference to the drawings which show a cash register having setting levers and which form part of this specification.

Figure 8:
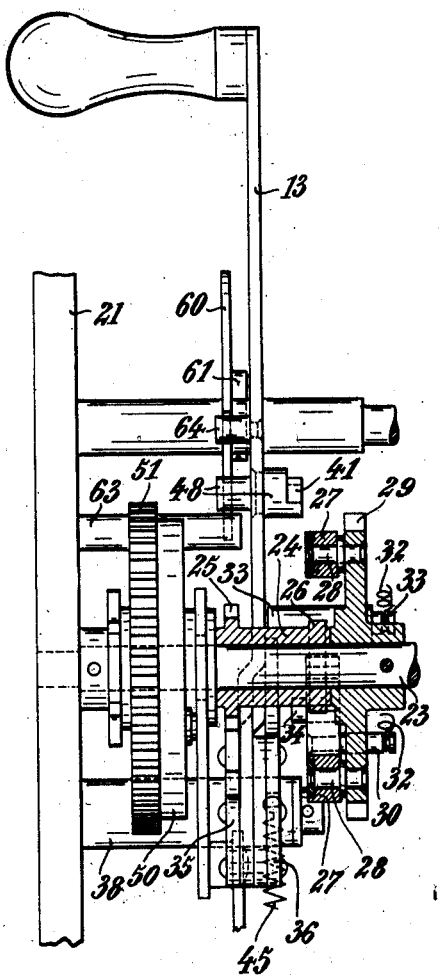
Figure 14:
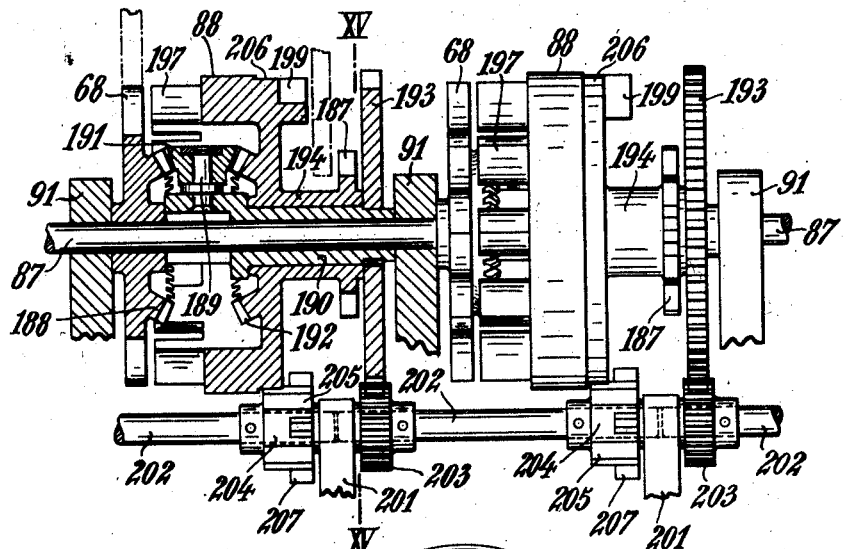
Figure 15:
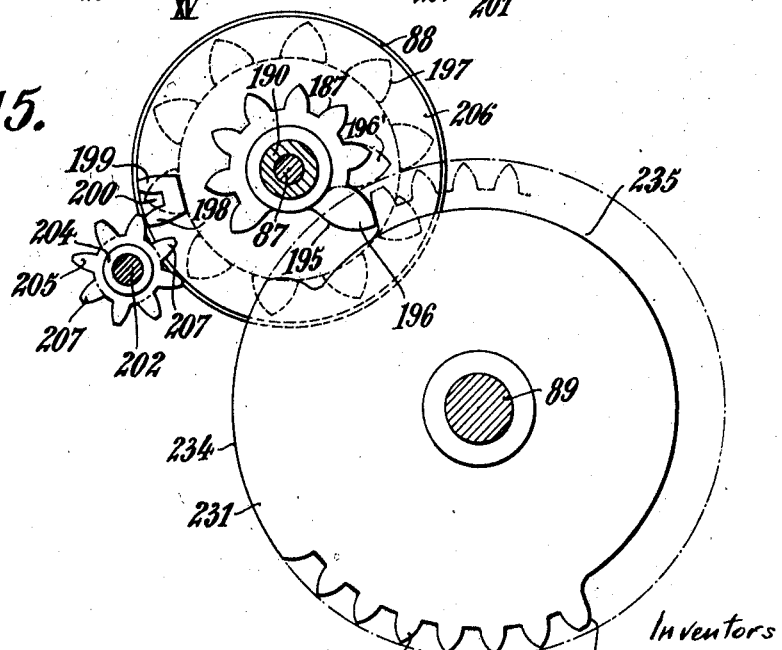

In these drawings:

Fig. 1 is a top plan of the machine,

Fig. 2 is a front elevation of the machine, the casing and totalizing mechanism being omitted, Fig. 3 is a vertical section through the machine on the line III—III of Fig. 2, seen from the right, the parts being illustrated in the position after the preparatory pull has been terminated, Fig. 4 is a section on the line IV—IV of Fig. 5, showing some parts of the drive for actuating the means for throwing-in the totalizing mechanism and the means for locking the setting levers, the parts being likewise in the position after the preparatory pull has been terminated, Fig. 4a is an enlarged view of the setting lock, Fig. 5 is a front view of the totalizing mechanism and of the main driving shaft with associated parts, Fig. 6 is a side view of the cam disk for locking the setting levers, Fig. 7 is a side view of the driving lever with associated parts of the driving mechanism in the position of rest, Fig. 8 is a corresponding front view, partly in section along the line VIII—VIII of Fig. 7, Fig. 9 is a view similar to Fig. 7 with the driving lever in the end position of working, Fig. 10 shows the hand lever in the catching position, Fig. 11 is a side view of the printing mechanism, Fig. 12 is a view similar to Fig. 11 but partly in section, Fig. 13 is a plan view corresponding to Fig. 11, Fig. 14 is a detail illustration of two counters of the totalizing mechanism, one being shown in section and the other in elevation, Fig. 15 is a section along the line XV—XV of Fig. 14, Figs. 16 to 20 are side views corresponding to Fig. 15, in different stages of operation.

The amount to be paid is set up by means of the handles 1 and transferred to the indicating wheels 2 and 75 (Fig. 1) and to the type wheels 3. The indicating wheels 2 for the customer are readable through an inspection opening 4 at the back of the machine and are arranged at the right hand side (Fig. 1) of the machine in close proximity to the counting board 5 which is disposed above the printing mechanism of the machine. Mounted in the cabinet of the printing mechanism in extension of the counting board 5 is a glass-plate 6 through which the last printed lines of the record strip 7 may be read. A slot 8 in the glass-plate 6 permits of recording hand-written remarks on the record strip. During the operation of the machine the strip with the printed line is moved by a special mechanism described below from the printing position designated by 9 (Fig. 11) into the position designated by 10 which is readable through the glass-plate 6 and from which it is returned at the end of the same operation up to the printing position 9 but for the space of one line.

Arranged near the money drawer 11 in the direction of the counting board 5 and glass-plate 6 is a special plate 12. The seller takes the amount paid by the customer from the counting board 5 and places it on the plate 12 where he leaves it until the customer has taken away from the counting board the surplus amount paid back to him. Thus, an easily surveyable control of the three amounts appearing during an act of payment is attained in combination with the indicating wheels and the data shown by the record strip.

The driving lever 13 of the machine is arranged at the left hand side (Fig. 1) so that in attending the cash register the seller has his right hand entirely free for accepting and paying out the money and entering hand-written remarks on the record strip.

Mounted in the side walls 21 and 22 (Fig. 2) of the machine is the main driving shaft 23 which loosely carries near its left hand end a sleeve 24 (Fig. 8) which is provided with a pinion 25 (Figs. 7 to 9) and with an actuating cam 26. The cam 26 is adapted to co-operate with two driver pawls 27 which are mounted on two pins 28 arranged at diametrically opposite points of a toothed wheel 29 which is fastened on the shaft 23. Pins 30 secured on the pawls 27 and extending through openings 31 of the toothed wheel 29 have attached to them springs 32 which are held at their other ends by pins 33 of the toothed wheel 29 and which tend to hold the pawls 27 in the path of the cam 26. Each of the pawls 27 carries still another pin 34 which serves to place the pawls 27 at the proper time out of engagement with the cam 26. The pinion 25 of the sleeve 24 is in constant mesh with a toothed segment 35. This segment and a locking segment 36 are riveted on the hand lever 13 and mounted for rotation with the latter on a stub shaft 38 which is fastened in the left hand side wall 21. The segment 36 has a hole 39 which is engaged by one end of a retracting spring 45 (Figs. 7, 8, and 9), the other end of which is fastened to a rod 40 (Fig. 3) and which tends to hold the hand lever 13 in the position of rest illustrated in Fig. 7 in which the lever bears against a shaft 46 which is covered with a leather sleeve 47. The hand lever 13 carries a pin 48 which is flattened at two sides and designed to co-operate with the pins 34 of the pawls 27. The pins 33 (Fig. 8) have thickened extensions on the left hand side of the toothed wheel 29 and project into the path of the segment 36 and co-operate with the arc-shaped locking surface 49 of the latter (Figs. 7, 9). Secured on the main shaft 23 at the left hand side of the sleeve 24 is a cam disk 50 (Figs. 4, 5 and 8) which carries teeth 51 on its circumference. A pawl 53 influenced by a spring 52 (Fig. 3) and freely mounted on a pin 54 of the left hand side wall is in constant engagement with the teeth 51 and prevents a retrograde movement of the main shaft 23. When, for the purpose of operating the machine, the hand lever 13 is moved against the action of spring 45 from the position of rest (Fig. 7) into the position according to Fig. 9 in which its movement is stopped by the shaft 23, the cam 26 has imparted to it through the intermediary of the toothed segment 35, pinion 25 and sleeve 24 a rotation in clockwise direction for about 180 degrees, this rotation being transmitted to the toothed wheel 29 and the main driving shaft 23 through that pawl 27 which is in engagement with cam 26.

When the lever 13 is in its position of rest (Fig. 7), the actuating cam 26 projects into a recess 56 of the pawl 27 lying opposite the cam. The said recess is bordered by a wall 57 and a hook-shaped portion 58. At about the end of the driving movement of the hand lever 13, during which the cam 26 bears against the stop surface 57, the upwardly moving pin 34 of the actuated pawl 27 enters into engagement with the downwardly moving pin 48 of hand lever 13, and the obliquely positioned face 41 of pin 48 lifts the pawl 27 enough so that the hook shaped portion 58 of the pawl is raised out of the path of cam 26 on the return movement of the latter. In the end position of the hand lever (Fig. 9) the pawl 27 is held in the thrown-out position by the face 42, while the locking surface 49 of the hand lever takes its position below one of the pins 33, thereby preventing the driving shaft 23 from executing more than half a revolution.

During the return movement of the hand lever 13 into position of rest, the driving shaft 23 remains in the set position. The pin 48 of the hand lever 13 glides away underneath the pin 34, but does not release the same until the cam 26 is below the hook-shaped portion 58 of pawl 27. In this way, the cam 26 is prevented from re-engaging the recess 56 when pawl 27 is released. At about the end of the return movement, the cam 26 strikes from below against the other pawl 27 which is situated at the right hand side in Fig. 9; the said pawl is thereby lifted and, in the position of rest of the lever 13, its stop surface 57 is placed below the operating surface of cam 26 due to the action of the spring 32.

If the hand lever is thereupon operated a second time, the described cycle is repeated only with the difference that the last-said pawl 27 enters into action. At the end of this second movement of the hand lever all parts of the described device assume again their initial position. During the two operations of the hand lever the driving shaft 23 has made one complete revolution. Hereinafter, the first operation of the hand lever will be called "preparatory pull" and the second "printing pull".

During the downward movement of the hand lever 13 the hook-shaped portion 58 of the pawl 27 which is engaged fulfils, in combination with the pawl 53 (Fig. 3), the task of a full-stroke stop gear for the hand lever 13 and prevents the hand lever 13 from being moved back before it reaches its end position since the pawl 53 prevents retrograde movement of the drive shaft and pawl 27, and the hook shaped portion 58 of pawl 27 prevents backward movement of the hand lever 13 until the pawl 27 is raised at the end of the stroke of the hand lever.

In order to prevent the hand lever 13 from rebounding when it reaches its position of rest by the action of the retracting spring 45, there is provided an inertia stop gear. This gear consists of a pawl 60 which is loosely mounted on a shaft 59 and bears by a downwardly directed stop face 62 against a pin 63 of the left side wall (Figs. 8 and 9) under the action of gravity of its arm 61 which is directed toward the right. A stop arc 65 of the pawl 60 is adapted to co-operate with a pin 64 of the hand lever 13. During the normal forward movement of the hand lever 13 the pin 64 is not hindered in its movement by the stop arc 65 (Fig. 7). If, however, the hand lever 13 moves into its position of rest with a certain speed, the pawl 60 is thrown round in counter-clockwise direction in as much as the pin 48 which extends beyond the left hand side of the hand lever 13 strikes against the stop face 62. Thereby the stop arc 65 is placed before the pin 64 (Fig. 10), thus preventing a rebounding of the hand lever 13. Immediately thereafter the pawl 60 automatically returns into its position of rest in which it releases again the hand lever 13. The time elapsing before the return of pawl 60 to its position of rest which is fixed by a proper choice of the weight of the arm 61, is such that the hand lever 13 is released only upon its rebounding movement having come to an end. The action of gravity on the arm 61 may of course be replaced by a spring.

The setting up of the amount to be introduced into the machine is effected by means of the setting levers 66 (Figs. 2 and 3) carrying the handles 1 and mounted loosely on the main shaft 23 at equal distances from each other. In the present embodiment of the invention, the machine is assumed to have three orders in the setting mechanism and four orders in the totalizing, indicating and printing mechanism. The lever 72 (Fig. 2) which is arranged at the left hand side of the three setting levers 66, comes into action in the operation of taking totals, it possesses no handle 1 but, for the rest, it does not differ from the setting levers 66. The setting levers 66, 72 are provided at the front with toothed segments 67 (Fig. 3) which are designed to co-operate with intermediate wheels 68 for the totalizing mechanism, and at the rear with teeth 69 which are in constant mesh with toothed wheels 70 of indicating wheels 75 (Figs. 2 and 3). The indicating wheels 75 which are readable by the seller at the front of the machine, are mounted on the shaft 59 and, in a well-known manner, rigidly connected through the intermediary of this shaft and nested tubes 76 with the second set of indicating wheels 2 which are readable at the back of the machine through the inspection opening 4 (Figs. 1 and 3), as already mentioned above.

Toothed wheels 79 are secured to the three right hand indicating wheels 2. Three segment plates 74 consisting of a toothed segment 80 in mesh with the wheels 79 and toothed segments 81 in mesh with toothed wheels 82, are revolubly mounted on shaft 23. A fourth segment plate 74', having a toothed segment 81 engaging a wheel 82, is not provided with any segment 80, being directly connected to the right hand setting lever by a hub 73. The toothed wheels 82 are fastened on the tubes 84 surrounding a shaft 83 and on the shaft 83 itself, respectively. The tubes 84 and the shaft 83 are mounted in a bracket 71 (Fig. 2) which is bolted to the right hand side wall 22 of the machine. They extend towards the right hand through the wall 22 and carry at their right hand ends the type wheels 3.

By adjusting the setting levers 66, the indicating wheels 75, 2, the type wheels 3 and also the intermediate wheels 68 are set directly as will be hereinafter described. The connections between the setting levers 66 and the type wheels 3 are arranged so that the first type wheel 3 from the left corresponds to the first setting lever 66 from the left.

The intermediate wheels 68 of the totalizing mechanism (Fig. 3) are mounted on a shaft 87 of the totalizing mechanism which is fixed in the frame 86 of this mechanism. They are connected with counting wheels 88 (Fig. 5), which are readable at the front of the machine, through the intermediary of a tens transfer mechanism to be further described hereafter. The tens transfer mechanism enters into action simultaneously with the transmission of the amount from the setting levers 66 to the intermediate wheels 68.

The frame 86 of the totalizing mechanism is rotatably and shiftably mounted by means of two arms 91 on a shaft 89 which is rotatable but not shiftable in the side walls 21 and 22. The left hand side arm 91 is provided with a pin 94 (Fig. 5) by means of which frame 86 engages an arm 93 which is secured to a sleeve 92. The latter is mounted rotatably but not shiftably on the shaft 89 and carries at its left hand end an integral arm 90. Pivotally connected to this arm is a rod 95 the other fork-shaped end of which embraces the shaft 23. The rod 95 besides carries a roller 96 which is in engagement with a curved groove 97 on the right hand side of the cam disk 50. When the shaft 23 is being rotated, the curved groove 97 causes a to and fro rocking movement of the totalizer frame 86 about shaft 89, whereby the intermediate wheels 68 are placed into and out of engagement with the setting levers 66. The curved groove 97 is of such a configuration that the totalizing mechanism is thrown into engagement with the setting levers 66 at the end of the preparatory pull after the latter have been returned to zero position in a manner to be described, so that the amount subsequently set by the setting levers will be run directly into the totalizer by the setting operation, and is thrown out of engagement with the setting levers during the printing pull.

Arranged for co-operation with the teeth 69 (Figs. 2 and 3) of the setting levers 66, 72 are rollers 98 carried by levers 99 which are rotatably mounted on the shaft 46. A spring 101 which is connected by one end with a downward extension of the levers 99 and by its other end with the rod 40, yieldably holds the roller 98 of each lever 99 in engagement with the corresponding teeth 69, so that the several setting levers 66, 72 are yieldably locked in their set positions. This group of elements is referred to hereinafter as "a rack and spring-detent mechanism".

The shaft 46 has fastened on it a yoke 102 consisting of two side arms 103, 104 and a cross bar 105. The cross bar 105 carries set screws 106 which co-operate with the narrow rear surface 107 (Fig. 3) of the levers 99, while rearward extensions 108 of these levers engage the cross bar 105 from below. A rotation of the yoke 102 in counter-clockwise direction causes the rollers 98 to be pressed into the teeth 69, thereby locking the setting levers 66 as well as the indicating and type wheels 75, 2, 3 against any movement. By swinging the yoke 102 in clockwise direction, this being effected before returning the setting levers 66 into the zero-position, the rollers 98 are disengaged from the teeth 69 by means of the cross bar 105 and extensions 108 so that the return movement of the setting levers 66 may take place without being hindered by the springs 101.

The left hand arm 103 of the yoke 102 is provided with an upward extension 109 (Figs. 2 and 3) carrying a set screw 110 which is in contact with a pin 111 of a side arm 112 of a shutter 113 which is loosely mounted on shaft 59. The shutter extends along the rear side of the indicating wheels 75, 2. A pin 115 fastened on the left hand side arm 112 of the shutter 113 has connected to it one end of the spring 52 which tends to turn the shutter 113 in counter-clockwise direction. This rotation is limited by a pin 116 which is secured in the left hand side wall 21 and against which the pin 115 bears. As long as the yoke 102 occupies the position illustrated in Fig. 3, the shutter 113 covers the inspection opening 4 for the indicating wheels 2. If, during the printing pull, yoke 102 is rocked in counter-clockwise direction for locking the setting levers 66, the shutter 113 is moved downwards so that it uncovers the inspection opening 4. The yoke 102 is actuated by a curved groove 117 (Fig. 6) arranged in the left hand side of the cam disk 50 (Figs. 4 to 6) and engaged by a roller 118 of a connecting rod 119 which embraces the shaft 23 by means of a fork-shaped end. The connecting rod 119 is pivoted by means of a pin 120 to the left hand side arm 103 of the yoke 102.

The toothed wheel 29 fixed on shaft 23 (Figs. 2 and 3) is in constant mesh with a toothed wheel 125 which is of the same size and fastened on a shaft 126 mounted in the side walls 21 and 22. The shaft 126 carries returning arms 127 which are provided with a roller 128 and a locking face 129, in the form of an arcuate trailing surface following the roller 128 and having its center of curvature on the axis of shaft 126. These arms are rotated in counter clockwise direction and serve as cam members to return the setting levers 66, 72 as well as the indicating and type wheels connected therewith into zero-position. They do not act directly on the setting levers 66, 72 but on the intermediate segment plates 74, 74', each roller 128 co-operating with a camming surface 130 of the corresponding segment plates 74, 74' and each locking surface 129 co-operating with a roller 131 carried by the respective segment plates 74, 74'. During the rotation of the shaft 126 taking place in the course of the preparatory pull the segment plates 74, 74' whose camming faces 130 have been brought into the path of the rollers 128 during the adjustment of the setting levers 66, are returned by the rollers 128 into the zero-position, the movement of the setting levers 66, 72 being limited by lower stop faces 132 striking against leather cushions 133 of the shaft 126. A rebounding of the setting levers is prevented by the engagement of the locking faces 129 with the rollers 131. At the moment the setting levers reach their zero positions the cam members 127 just fill the spaces between their supporting shaft 126 and the camming surface 130 and transmit any rebounding forces directly to the shaft 126, by which they are absorbed. After the termination of the preparatory pull the parts assume the position illustrated in Fig. 3, in which the segment plates 74 and the rollers 131 are released by the rollers 128 and the locking faces 129, respectively.

Mounted loosely on the shaft 126 (Figs. 2 and 3) is a lever 135 which is under the action of a spring 134 and adapted to co-operate by its upper bent-off end 136 with a cam disk 137 which is fixed on the main driving shaft 23. The lower end of the lever 135 (Fig. 3) co-operates with a locking plate 140 which is arranged at the back side of the money drawer 11. The drawer is placed under the influence of a pressure spring 138. During the printing pull the lever 135 has imparted to it by the rising face 145 of the cam disk 137 a rotation in counter-clockwise direction, whereby the locking plate 140 is released and the money drawer 11 shifted forwardly under the action of spring 138. At the end of the printing pull the bent-off end 136 takes a position opposite a notch 146 of the cam disk 137. The bent-off end 136 enters the notch 146 under the action of the spring 134 and thereby locks the shaft 23 and the hand levers 66. When the money drawer is pushed back the lower end of the lever 135 snaps again behind the locking plate 140 and holds the drawer closed, while at this time the end 136 of the lever 135 has been moved out of the notch 146 and the shaft 23 released. As long as the money drawer 11 is not closed, it is therefore impossible to execute the preparatory pull during which the setting levers 66 are released.

The printing mechanism which is arranged at the right hand side of the machine and surrounded by a special cabinet 147 (Figs. 2 and 11) is driven by the main driving shaft 23 which projects through the right hand side wall 22 and carries on the respective end a cam 148 (Figs. 11, 13) which is designed to actuate the printing plate 149. The latter is mounted on a pin 150. Rigidly connected with the printing plate is an arm 151 which is placed under the influence of a spring 152 by the action of which a roller 153 of the arm 151 is held in contact with the cam disk 148. During the printing pull, the printing plate 149 is pressed against the type wheels 3 for effecting the impression and released again at the end of the printing pull so that it is lifted from the type wheels 3 by the action of spring 152.

The winding and unwinding rollers 154, 155 (Figs. 11, 12, 13) for the record strip 7 are arranged on an oscillatory frame 157 which is mounted on a pin 158 of the right hand side wall (see Figs. 12, 13). The record strip 7 travels from the unwinding roller 154 over a guide rod 159 of the oscillatory frame 157, between the type wheels 3 and the platen 149, over a writing plate 160 fastened on the side wall 22 and over another guide rod 161 of the oscillatory frame 157 to the winding roller 155. The winding roller 155 which is mounted for rotation on the pin 158, is connected with a ratchet wheel 162 which co-operates with a feed pawl 163 and a locking pawl 164. The feed pawl 163 is mounted by means of a pin 141 on an actuating member 165, which, in turn, is mounted for loose rotation on the oscillatory frame 157 by means of a pin 166. A spring 167 connects the actuating member 165 with the feed pawl 163. A pin 168 of the actuating member 165 engages a curved groove 169 of a plate 170 which is fixed on the right hand side wall 22.

The to and fro movement of the oscillatory frame 157 is produced by means of a cam disk 175 (Figs. 2 and 12) which is fixed on shaft 23 at the left side of the right hand side wall 22. The cam disk 175 co-operates with a roller 176 of a connecting rod 177 which is pivoted to the oscillatory frame 157 by means of a pin 171. A spring 178 (Fig. 11) holds the roller 176 in contact with the cam disk 175. The latter causes the oscillatory frame 157 to assume at the end of the preparatory pull its right hand end position (Fig. 12) and at the end of the printing pull its left hand end position which is in part illustrated in Fig. 11 in dot and dash lines and designated by 157'. In the intermediate position (dotted position 157'', Fig. 11), which the oscillatory frame 157 occupies in the course of its rocking movement, the lines of connection between the centers of the rods 159, 161 and the axis of rotation of the frame extend perpendicularly with respect to the corresponding sections of the record strip extending toward the writing plate 160. It is thereby attained that the whole section of the record strip lying between the winding and unwinding rollers 154, 155 does not change its length during the rocking movement of the oscillatory frame 157. The above described mechanism serves to effect the line feed of the record strip and to make the last printed lines visible. At the end of the preparatory pull the last printed lines on the record strip 7 are readable through the glass-plate 6 of the cabinet 147 of the printing mechanism. The counter-clockwise rocking movement of the frame 157 during the printing pull causes the record strip 7 to be pulled over the writing plate 160 in such a manner that the last printed line is brought up to the printing position designated by the arrow 9 but for the space of one line. During this rocking movement the ratchet wheel 162 is held in its position by the locking pawl 164, while the actuating member 165, owing to the engagement of its pin 168 with the curved groove 169, executes a clockwise rotation with relation to the oscillatory frame 157, whereby the feed pawl 163 is caused to glide upwardly over two teeth of the ratchet wheel 162. When the frame 157 is swung back during the preparatory pull, the record strip 7 is again returned to the position which it assumed at the end of the preceding printing pull and in which its last printed lines were readable through the glass-plate 6. At the same time the feed pawl 163 enters into action. Owing to its co-operation with the curved groove 169, it executes during the return to its initial position a movement with relation to the ratchet wheel 162, which movement causes the wheel 162 to be moved on by two teeth and the record strip to have imparted to it an additional movement by the space of one line. The printing line designed for the next printing pull is thus brought below the writing opening 8 so that handwritten records may be made. In the space of time between the printing pull and the preparatory pull there lies below the glass-plate 6 a portion of the record strip which contains prints produced during former operations of the machine. In order to make these prints invisible for avoiding errors, there is provided a shutter 181 (Figs. 11, 13) which is pivoted to the guide rod 161 by means of arms 182. The movements of the oscillatory frame 157 are transmitted to the shutter 181 by the rod 161. At the end of the preparatory pull the shutter assumes the position shown in full lines in Fig. 11, while at the end of the printing pull it assumes the position shown in dotted lines in Fig. 11.

The tens transfer mechanism is constructed as follows. As mentioned above, the intermediate wheels 68 co-operating with the setting levers 66, 72 (Fig. 3) are mounted on the shaft 87 which is fixed in the frame 86 of the totalizing mechanism. They are provided on their right hand sides with bevel teeth 188 (Fig. 14) with each of which meshes an intermediate wheel 191 which is perpendicular with relation to the shaft 87 and mounted for rotation on a pin 189 of a sleeve 190. On the other side, this intermediate wheel 191 is in constant mesh with bevel teeth 192 of the counting wheel 88. The sleeve 190 is rotatable but not shiftable on shaft 87; it has rigidly fastened on its right hand end a toothed wheel 193 and rotatably carries on its circumferential surface the counting wheels 88 the hubs 194 of which are rigidly connected with zeroizing wheels 187. The zeroizing wheel 187 has the shape illustrated in Fig. 17. It is provided with a gap 195 and an enlarged tooth 196. The counting wheels 88 are further provided on their left hand side faces with teeth 197 which correspond in pitch and number to the teeth of the intermediate wheels 68 and serve to place the counting wheels 88 into direct engagement with the setting levers 66, 72 when the totalizing mechanism is shifted laterally. The counting wheels 88 carry on the right hand side two feed teeth 198, 199 which are separated from each other by a tooth space 200. Mounted in arms 201 of the frame 86 of the totalizing mechanism are stub shafts 202 each of which has at its left hand end a pinion 203 meshing with the toothed wheel 193 and at its right hand end a transfer wheel 204 with eight teeth. The left half of each second tooth of the transfer wheel is omitted, so that its left portion possesses only four teeth 205. The space between the teeth 205 which happens to be directed toward the shaft 87 is engaged by the right hand portion of the counting wheel 88 of the next lower order, this portion forming a locking surface 206 and being adapted to hold the transfer wheel 204 in its respective position of rotation. The right hand portion 207 of the carrying wheel 204 having eight teeth lies in the same plane as the feed teeth 198, 199 of the counting wheel 88. One of the teeth 207 is always directed toward the shaft 87.

Arranged below the totalizing mechanism on the shaft 89 (Fig. 3) and on an auxiliary rod 208 are locking members 221. These locking members are held laterally by means of suitable notches 222 in the frame 86 and, when the totalizing mechanism is being rocked downwardly, are adapted to enter into engagement with the intermediate wheels 68 and the teeth 197 for holding the counting wheels 88 and the differential wheels 68 against undesired movements.

The operation of the transfer mechanism is as follows: At the end of the preparatory pull the intermediate wheels 68 are in engagement with the setting levers 66, 72. Owing to its form-closure connection with the transfer wheel 204 through the intermediary of sleeve 190 and toothed wheels 193, 203 and 204, the pin 189 of the intermediate wheels 191 is held in its position as long as a passage from 9 to 0 does not occur in the counting wheel 88 of the next lower order. If one of the setting levers 66 is set on a definite amount, its movement is transmitted by the associated intermediate wheel 68, the intermediate wheels 191 and the teeth 192 to the corresponding counting wheel 88 which is caused to rotate by a number of units corresponding to the amount set. If, during this operation, a passage from 9 to 0 takes place in the counting wheel 88, the feed tooth 198 strikes on the tooth 207 of the transfer wheel 204 which is directed toward the shaft 87 and imparts to the wheel 204 a rotation of 90 degrees, this rotation being rendered possible by the space 200 which releases the respective tooth 207, 205, while the bearing pin 189 of the intermediate wheel 191 has imparted to it a rocking movement about the shaft 87. Owing to this rocking movement the intermediate wheel 191 rolls on the teeth 188 and transmits through the teeth 192 to the counting wheel 88 of the higher order a rotation which amounts to a counting unit on the ground of the selected ratio of transmission. The intermediate wheel 68 is at this time in engagement with the setting members 66, 72 and may be at rest or rotated for transmitting an amount to the counting wheel. The described transfer mechanism may also be utilized for subtractive transfer operations, but this fact is not made use of in the present cash register.

The additive rotation of the counting wheels 88 takes place in counter-clockwise direction (Fig. 15), which means that their upper part in Fig. 14 is to be considered as stepping out of the plane of the drawing. It will be understood that, owing to the arrangement of the gear 188, 191, 192 on the left hand side of the counting wheel 88, the sleeve 190 is moved in the same sense as the counting wheel 88 mounted on it during the transfer operation, so that in a current transfer operation the friction between the counting wheels 88 and the sleeves 190 is considerably reduced.

Fig. 15 shows a counting wheel 88 in the position 9. In this position, the teeth 205 co-operating with the locking surface 206 are completely covered by the same. During the rotation of the counting wheel 88, the transfer wheel 204 has imparted to it a rotation only upon the feed tooth 198 reaching the protruding tooth 207. At this time the left tooth 205 has likewise been released by the space 200 and is adapted to enter into the latter during the continued rotation of the counting wheel 88. The rotation of the transfer wheel 204 by 90 degrees comes to an end before the counting wheel 88 will have reached the position 0. In this position the two teeth 205 which are in operative position, are covered by the locking surface 206. This shows that only a part of the movement of the counting wheel 88 between the positions 9 and 0 is used for rotating the transfer wheel 204, while the other part is used for obtaining a complete covering of the teeth 205, that is a locking of the wheel 204.

This feature of the invention, which is attained by a suitable selection of the ratio of transmission of the gear between the transfer wheel 204 and the counting wheel 88 of the higher order, is not only of importance for the current transfer operation but also for zeroizing the counting wheels 88. During the zeroizing of the counting wheels 88, the intermediate wheels 68 are disengaged from the setting members 66, 72 as will be further described hereinafter. If in the position 0 of the counting wheels 88 the position of the transfer wheels 204 is not accurately fixed, which would be the case if the space 200 would face a tooth 205, an inaccurate position of the intermediate wheels 68 would be entailed. In such a case it might occur that when re-engaging the intermediate wheels with the setting members the teeth of these elements would place themselves on one another or enter into a wrong engagement. In the present device this possibility is securely avoided.

The setting of the type wheels to the total accumulated in the counting wheels 88 is performed in such a manner that the counting wheels 88 are placed directly into engagement with the setting members 66, 72 and thereupon returned into their zero-position by the driving mechanism of the machine. The operation of the machine performing the printing of the total differs from the normal amount-introducing operation of the machine by the fact that before the beginning of the same there is adjusted a selecting means and that no amount is introduced between the preparatory and printing pull.

The above-mentioned selecting means is in the form of a lock 209 (Fig. 5) which is arranged in the left hand side wall 21 of the cash register. By introducing and turning a key, a pin 210 of this lock, which projects into the interior of the machine, may be rocked, in a manner not further described, from its middle position shown in Figs. 4, 4a and designed for the amount-introducing operations, towards the right or the left for about 105 degrees. In the right hand end position, which is the locking position, the machine is locked against any operation, while in the left hand end position, which is the total taking position, the machine is adjusted for the operation of taking totals.

The pin 210 engages a slot 211 of a selecting member 213 which is loosely mounted on a pin 212 (Fig. 4) of the side wall 21. This selecting member is rigidly connected by a hub 214 with a locking lever 215 which co-operates with a stop edge 216 of the hand lever 13 (Fig. 7) in such a manner that the hand lever and also the setting levers 66 are locked when the pin 210 occupies its locking position 217, and that on the other hand the lock 209 is prevented from being rotated into the locking position as long as the hand lever 13 is not in its position of rest.

The locking lever 215 is connected by means of a link 218 (Figs. 4, 5) with a cam member 219 which is rotatable but not shiftable on the sleeve 92. The curved slot 220 (Fig. 5) of the cam member 219 is engaged by a pin 225 of the totalizer frame 86. When pin 210 is moved into locking position 217 the cam member 219 is displaced upwardly, and when the pin is moved into the position 226 for taking totals the cam member is displaced downwardly. The curved slot 220 is of such a configuration that the first-named movement of the pin 210 does not influence the totalizing mechanism. However, when moving the pin 210 into total taking position 226, the totalizing mechanism is shifted toward the left. The pin 94 then glides in the hole of the arm 93 which connects the totalizer frame 86 with the connecting rod 95 designed to throw the totalizing mechanism in and out.

The shaft 89 carries at its left hand end a toothed wheel 227 which is in constant mesh with the toothed wheel 51 which is of the same size. During each operation of the machine, the revolution of the main shaft 23 which takes place in two steps is transmitted to the shaft 89 through the intermediary of the gear 51, 227.

The toothed wheel 227 carries at its left hand side a stop rim 228 which has a recess 229 (Figs. 4, 5) and co-operates with a pin 230 of the selecting member 213. In the position of rest of the machine, i. e. before the beginning of the preparatory pull, the recess 229 lies opposite the pin 230 so that the selecting member 213 may be moved unhinderedly into the total taking position. As soon as the operation of the cash register has been started, the lock 209 can neither be moved into nor out of the total taking position, since the stop rim 228 prevents the pin 230 from making the respective movements. Besides, the operation of the machine cannot be started if the lock occupies an intermediate position between normal and total taking position since the pin 230 in the intermediate position lies within the recess 229 and engages the side of said recess to lock the toothed wheel 227 against motion. Since the toothed wheel 227 is in engagement with the toothed wheel 50 on the main shaft 23, the locking of the toothed wheel 227 prevents the operation of the machine.

The shaft 89 has rigidly fastened on it a plurality of zeroizing disks 231 (Fig. 15) corresponding in number to the number of orders of the totalizing mechanism and adapted to co-operate with the zeroizing wheels 187. The disks 231 possess at their circumference a locking face 234, an idle space 235 and a series of teeth 232, the first tooth 233 of which is somewhat set off.

In the right hand end position of the totalizing mechanism (Fig. 5), which is designed for the normal operations of the machine, the zeroizing wheels 187 are out of the path of the disks 231. In this position of the totalizing mechanism, the wheels 187 are not influenced by the rotation of shaft 89 taking place during the operation of the machine. When the totalizing mechanism is shifted into its left hand end postion by setting the lock 209 into the total taking position, the zeroizing wheels 187 enter into the path of the disks 231. Before the beginning of the operation of the machine the disks 231 assume the position illustrated in Fig. 15 in which the zeroizing wheel 187 faces the space 235 of disk 231. At the end of the preparatory pull the offset tooth 233 assumes the dot and dash line position (Fig. 15). If the respective counting wheel 88 is not in the zero position, which is illustrated by the dot and dash line position 196' of the tooth 196, (see also Fig. 16) but in one of the positions 1 to 8, teeth of the wheel 187 will project into the space 235 of the disk 132, (see Fig. 17) while with the counting wheel in the position 9, as indicated in Fig. 15, the enlarged tooth 196 projects into the said space. During the second half revolution of the disk 231 which is produced by the printing pull, the teeth 233 enter into engagement with the said teeth of the wheel 187 (see Fig. 18) and impart rotation to the counting wheel until it reaches the zero position in which the enlarged tooth 196 strikes on the apex of the teeth 232 (see Fig. 19). The lower flank of the tooth 196 is formed so that the tooth cannot enter into the teeth 232 but glides over the latter. In the course of the further rotation, the locking face 234 enters into the gap 195 of the zeroizing wheel 187 and locks the same against rotation (see Fig.

20). Upon the printing pull having been terminated, the disks 231 assume again the initial position represented in Fig. 15. When the totalizing mechanism is shifted into the left hand end postion by adjusting the lock 209 into total taking position, the teeth 197 of the counting wheels 88 enter into the planes of the setting members 66, 72 so that the throwing-in of the totalizing mechanism during the preparatory pull causes the teeth 197 instead of the differential wheels 68 to be engaged with the setting members 66, 72, which means that the counting wheels 88 are placed in direct connection with the setting members 66, 72 and through the latter with the type wheels 4. Hence, if the counting wheels are returned to zero in the above-described manner, the type wheels take part in this movement and, in as much as the returning of the counting wheels takes place in the subtractive sense, they are set on the numeral which was being indicated by the counting wheel 88 prior to the beginning of the zeroizing motion.

Arranged at the front side of the totalizer frame 86 is a shutter 236 (Fig. 4) having inspection holes 237 for the counting wheels 88. If the totalizing mechanism is in total taking position, these inspection holes 237 register with inspection holes 238 (Fig. 1) at the front of the cabinet of the machine. In the other position of the totalizing mechanism the inspection holes 238 are covered by the shutter 236. In order to read the totalizing mechanism, it is therefore only necessary to set the lock 209 in total taking position. After the act of reading the lock 209 may be readily returned to its normal position.

Considering the new cash register as a whole, its operation is as follows:

In the position of rest of the cash register, i. e. after the printing pull of the last operation of the machine has been terminated and the money drawer 11 pushed back, the setting levers 66, 72 (Figs. 2, 3) and the indicating and type wheels 75, 2, 3 are locked by the yoke 102 in the position into which they have been brought during the last operation of the machine. The shutter 113 uncovers the inspection opening 4 for the indicating wheels 2, while the shutter 181 (Fig. 11) of the printing mechanism covers the inspection and writing opening 6 for the record strip 7, since the oscillatory frame 157 is in its left hand position. The money drawer 11 is locked in its closed position. The totalizing mechanism is out of engagement with the setting levers 66, 72. If the lock 209 assumes its normal position, the totalizing mechanism occupies its right hand end position in which the inspection holes 238 are covered by the shutter 236.

The kind of operation of the machine depends on the position of the lock 209.

*(1) Locking of the machine*

When the lock 209 is in the locking position the pin 210 occupies the position indicated by 217 (Fig. 4a) in which the locking lever 215 (Fig. 4) is situated below the locking edge 216 of the hand lever 13 and holds the same against rotation. As the hand lever 13 is locked the setting levers 66 and the money drawer 11 are likewise locked.

*(2) Introducing an amount*

The lock 209 is in its middle position (Fig. 4) in which the hand lever 13 is released by the locking lever 215 and the totalizing mechanism occupies its right hand end position.

For starting the operation of the machine there is first carried out the preparatory pull by pulling the hand lever 13 down one time and then releasing it again. The preparatory pull causes the following changes to take place in the machine. The yoke 102 (Figs. 2 and 3) is rocked in clockwise direction so that the rollers 98 are lifted out of the teeth 69 of the setting levers 66, 72 by means of the r levers 99. At the same time the shutter 113 moves upwardly under the action of its spring and covers the inspection opening 4. The setting levers 66 are returned into zero position, and also the setting lever 72 in case same should have been brought out of zero position such as in a preceding operation of taking a total. The levers 99 are thereupon released by yoke 102 so that the rollers 98 engage the teeth 69 of the setting levers 66, 72 and yieldably hold the same in their positions. The totalizing mechanism is then rocked so as to place the intermediate wheels 68 into engagement with the setting levers 66, 72 and at about the same time the oscillatory frame 157 (Fig. 11) of the printing mechanism is rocked toward the right hand side so as to cause the line feed of the record strip, the displacing of the last printed lines below the inspection and writing opening 6 and the uncovering of this opening by the shutter 181 to take place. The cash register is now ready for the introduction of another amount by means of the setting levers 66 and for the entering of a hand-written remark on the strip 7.

The setting of the hand levers 66 causes at the same time the setting of the indicating wheels 75, 2 and type wheels 3 and the transmission of the respective amount to the totalizing mechanism in which the transfer is produced by the setting of the amount itself, as described above in detail. After a hand-written remark has been entered upon the record strip, there is executed the printing pull by pulling the hand lever 13 down one time and thereupon releasing it again. The printing pull causes the following changes to take place in the machine. The rollers 98 are pressed into the teeth 69 of the setting levers 66, 72 by the rocking motion of the yoke 102 in counter-clockwise direction, so that these as well as the indicating and type wheels 75, 2, 3 are locked against any movement. The movement of the yoke 102 causes also the downward movement of the shutter 113 which uncovers the inspection opening for the indicating wheels 2. The totalizing mechanism is thrown out of engagement with the setting levers 66, 72, whereby the intermediate wheels 68 and the teeth 197 are placed into engagement with the locking members 221, 223. The oscillatory frame 157 (Fig. 11) of the printing mechanism is rocked toward the left hand side, whereby the new printing line is brought into the printing position 9 and the shutter 181 below the inspection and writing opening 6 so that the record strip 7 is covered and hand-written records can no longer be made. The money drawer 11 (Fig. 3) is thereupon released and caused to slide into open position under the action of its spring 138. At about the end of the printing pull, the platen 149 (Fig. 11) is pressed against the type wheels 3 and then immediately released again, this operation causing the impression of the amount set to be effected.

After the printing pull has been terminated, there follows the act of payment between the seller and the customer which act is brought to an end by closing the money drawer 11. As long as the money drawer is not closed, the hand lever 13 remains locked by the lever 135 and the cam disk 137.

In the present embodiment of the invention the two operative movements of the driving mechanism are executed by pulling the hand lever twice. By using suitable coupling means between the hand lever and the driving shaft, the arrangement may of course be made in such a manner that the downward movement of the hand lever produces the preparatory pull and that its upward movement produces the printing pull. Besides, the hand lever may be replaced by a rotary crank which is moved in two steps.

(3) Taking totals

By placing the lock 209 (Fig. 5) into the total taking position, the totalizing mechanism is shifted from its right hand end position into its left hand end position. The teeth 197 are thereby caused to take the place of the intermediate wheels 68 and to enter into the planes of the setting levers 66, 72, while the zeroizing wheels 187 are moved into the planes of the disks 231. The pin 230 (Fig. 4) passes through the recess 229 of the stop rim 228. The shifting movement of the totalizing mechanism causes the counting wheels 88 to be brought into register with the inspection holes 238 (Fig. 1) so that the total accumulated in the totalizing mechanism may be read. The totalizing mechanism is still in its thrown-out position and is locked by the locking members 221, 223 (Fig. 3). The preparatory pull which is now carried out, produces in the cash register the same change as the preparatory pull for introducing an amount. The setting levers 66, 72 are unlocked, the shutter 113 is brought before the inspection opening, the setting levers are returned and yieldably locked in the zero position, the totalizing mechanism is placed into engagement with the setting levers 66, 72 which are being set to zero, and the oscillatory frame 157 of the printing mechanism is moved so that the inspection and writing opening is uncovered and the line feed of the record strip effected. Owing to the rocking movement of the totalizing mechanism the teeth 197 enter into engagement with the setting levers 66, 72. At the end of the preparatory pull, the disks 231 of the shaft 89 have carried out their first half revolution (Fig. 3), their tooth 233 occupying the position indicated in dot and dash lines in Fig. 15.

The preparatory pull is immediately followed by the printing pull, in the course of which the following changes are produced in the cash register. The counting wheels 88 are returned by the teeth 232 into their zero position, the type wheels being at the same time set on the total has been container in the totalizing mechanism, and the setting levers 66, 72 and along with them the indicating and type wheels are locked in the set positions. The shutter 113 uncovers the inspection opening 4, the totalizing mechanism is disengaged from the setting levers 66, 72 and re-engaged with the locking members 221, the oscillatory frame 157 of the printing mechanism is rocked towards the left whereby the inspection and writing opening 6 is covered and the new printing line brought into the printing position 9, the money drawer 11 is released and glides forward under the action of its spring 138. Finally, there takes place the impression of the type wheels which are set on the total of the totalizing mechanism. At the end of the printing pull the totalizing mechanism is in the zero position and the recess 229 of the stop rim 228 makes the lock 209 free for another adjustment. A dispacement of the setting levers after the preparatory pull and before the printing pull is without any influence on the correct transmission of the total sum, since the counting wheels 88 cannot be set back further than into the zero position because in that position the tooth 196 strikes on the tooth 233.

The key holes 240, 241 in the stationary portion of the lock 209 (Fig. 4a) are arranged so that the key may be inserted and withdrawn in the normal and in the locking position of the lock. The inserting and withdrawing of the key in the total taking position is not possible, so that the cash register has to be set for the introduction of amounts or for being locked if it should be desired to withdraw the key after the operation of taking the total.

We claim:

1. In a cash register, a rockable hand lever, resilient means urging said hand lever into a position of rest, a pivoted lever having a locking arc, a pin on said hand lever adapted to cooperate with said locking arc, impositive means urging said locking arc out of the path of said pin, and means for striking said pivoted lever to move said arc into the path of said pin upon movement of said hand lever into position of rest, said pivoted lever being adapted to remain by its inertia with its arc in the path of said pin until the rebounding tendency of said hand lever has come to an end, and then move under the influence of said impositive means out of the path of said pin.

2. In a total taking device, in combination, a counting wheel, a zero setting wheel connected with said counting wheel, a partially toothed zero setting disk for actuating said zero setting wheel during the operation of taking a total, said zero setting wheel having a recess and an enlarged tooth adjacent said recess, said enlarged tooth being adapted to glide on the teeth of said zero setting disk in the zero position of the counting wheel and prevent the latter from overthrowing.

3. In a total taking device, an amount setting member, a totalizing mechanism mounted for rocking motion on a shaft and including a counting wheel, means for rocking said totalizing mechanism into engagement with the said amount setting member, a zero setting wheel connected with the counting wheel, a zero setting disk fixed on the rock shaft of the totalizing mechanism, means for shifting the totalizing mechanism laterally and bringing its zero setting wheel into the plane of the said zero setting disk, and means for rotating said rock shaft.

4. In a device of the class described, a totalizer mounted so as to be shiftable to and from operative position, means including a setting member for shifting said totalizer to and from operative position, a member adapted to be rotated by the driving mechanism of the machine, a stop rim on said member having a gap, a pin on said setting member adapted to cooperate with said stop rim to hold said setting member in either of two positions during the operation of the machine, said gap being opposite said pin in the position of rest of the machine.

5. In a device of the class described, a rotatable shaft adapted to be rotated by the driving mechanism of the machine, a totalizer mounted so as to be shiftable longitudinally with respect to said shaft, zeroizing wheels fixed upon said shaft and adapted to be moved into and out of engagement with the totalizing mechanism when the totalizer is shifted, means for shifting said totalizer including a setting member, a member fixed on said shaft having a stop rim interrupted by a gap, and a pin on said setting member adapted to cooperate with said stop rim to hold said setting member in one of two positions during the operation of the machine, said gap being opposite said pin in the position of rest of the machine, whereby the pin may be shifted to one side or the other of said stop rim.

6. In a device of the class described, a rotatable differential member, an abutment limiting the motion of said differential member in one direction and defining its position of rest, and means for returning said member, when displaced, into its position of rest against said abutment, said means comprising a camming surface on said differential member, a support located opposite said camming surface in the position of rest of said differential member, and a cam member adapted to be driven by the driving instrumentalities of the machine and to engage said camming surface and pass between said support and said camming surface, said cam member extending the full width of the space between said support and said camming surface when said differential member is in its position of rest.

7. In a device of the class described, a rotatable differential member, an abutment limiting the motion of said differential member in one direction and defining its position of rest, and means for returning said member, when displaced, into its position of rest against said abutment, said means comprising a camming surface on said differential member, a pivotally mounted cam member so located as to be adapted to engage said camming surface and to pass between the same and its own pivot, the radial length of said cam member being equal to the width of the space between its pivot and said camming surface when said differential member is in its position of rest, and connections whereby said cam member can be driven from the driving instrumentalities of the machine.

8. A device as set forth in claim 7 in which said cam member is provided with an arcuate trailing surface having its center of curvature at the pivotal axis of the cam member and adapted to oppose the rebound of said differential member from said abutment.

9. In a device of the class described, a setting lever, a pivotally mounted locking lever adapted to engage said setting lever, means for yieldably holding said locking lever against said setting lever, a movable control member adapted to engage and positively hold said pivoted lever in engagement with said setting lever upon movement in one direction, and to engage and move said pivoted lever from engagement with said setting lever upon movement in another direction, and means for positively moving said control member in both directions.

10. In a device of the class described, a setting lever having a rack thereon, a pivoted locking lever adapted to engage said rack, means for yieldably holding said locking lever against said rack, and a movable control member for said locking lever adapted to engage and positively hold said locking lever upon movement in one direction and to engage and move said pivoted lever from engagement with said setting lever upon movement in another direction, and means for positively rocking said control member and thereby said locking lever in both directions, the connection between said control member and said locking lever being such as to permit said locking lever to ratchet over said rack when said control member is in an intermediate position.

11. In a cash register, amount setting members, a totalizer comprising counting wheels, intermediate wheels, differential gearing interposed between said counting and intermediate wheels, said intermediate wheels being connected to one member of the differential gearing, said counting wheels being connected to a second member of the differential gearing, and a transfer mechanism connected to a third member of said differential gearing, and means for selectively coupling said amount setting members to said intermediate wheels for entering amounts and directly to said counting wheels for total taking.

12. In a cash register, amount setting members, a totalizer comprising counting wheels, intermediate wheels, differential gearing interposed between said counting and intermediate wheels, said intermediate wheels being connected to one member of the differential gearing, said counting wheels being connected to a second member of the differential gearing, and a transfer mechanism connected to a third member of said differential gearing, means for selectively coupling said amount setting members to said intermediate wheels for entering amounts and directly to said counting wheels for total taking, and means for holding that member of said differential gearing which is connected to said transfer mechanism stationary during total taking, the member of said differential gearing which is connected to the intermediate wheel being free to rotate.

13. In a device of the class described, amount setting members, a totalizing mechanism comprising in each order a counting wheel and an intermediate wheel coaxially arranged, a differential pinion interposed between said wheels, a transfer gearing connected to said differential pinion so as to impart a planetary movement to the same, and means for selectively coupling said amount setting members to said intermediate wheels or to said counting wheels for entering amounts and for taking totals respectively.

14. In a total taking device, a counting wheel, a zero setting wheel connected with said counting wheel, said zero setting wheel having a recess and an enlarged tooth adjacent said recess, a zero setting disk for actuating said zero setting wheel during the operation of taking a total, the periphery of said zero setting disk being divided into a smooth locking face and a toothed actuating portion of substantially equal greatest diameter, and an idle portion of less diameter, said enlarged tooth being adapted to glide upon the teeth and locking face of said zero setting disk when said counting wheel is in zero position.

15. In a device of the class described, amount setting levers, a totalizing mechanism comprising in each order a counting wheel and an intermediate wheel co-axially arranged and of the same size, means constraining said wheels to rotate in opposite directions, and zero setting wheels connected with said counting wheels, means for shifting said totalizing mechanism laterally to bring either the intermediate wheels or the counting wheels into the planes of the amount setting levers, and zero setting disks adapted to mesh with said zero setting wheels in one of said positions of said totalizer.

16. In a device of the class described, a setting member, a registering device controlled thereby, a totalizer wheel, means including a reversing mechanism for connecting said setting member with said totalizer wheel, an adjusting device for causing the connection of said setting member and totalizer wheel for one direction of rotation for entering amounts, and for reversing the connection between said setting member and totalizer wheel for taking totals, and means for zeroizing said totalizer wheel.

17. In a device of the class described, a setting member, a registering device controlled thereby, a totalizer wheel, an intermediate wheel, a reversing gear between said wheels, means for engaging one of said wheels with said setting member for entering amounts, means for engaging the other of said wheels with said setting member for taking totals, and means for zeroizing said totalizer.

18. In a device of the class described, a totalizer wheel, an intermediate wheel, a reversing gear between said wheels, a setting member adapted to engage one of said wheels for entering amounts, a registering device controlled by said setting member, normally disconnected zeroizing means for said totalizer wheel, and a zero-setting mechanism adapted to connect said zeroizing means and to relatively shift said wheels and setting member to bring the other wheel into engagement with said setting member.

19. In a cash register, amount setting members, a totalizer comprising in each order a counting wheel, an intermediate wheel, and a differential gear interposed between said wheels, said wheels being connected respectively to two of the three members of said differential gear, a transfer mechanism connected to the third member of said differential gear, and means for relatively shifting said amount setting members and said wheels to selectively couple one or the other of said wheels to said amount setting members according to whether amounts are being entered or totals taken.

20. In a cash register, amount setting members, a totalizer comprising in each other a counting wheel, an intermediate wheel, and a differential gear interposed between said wheels, said wheels being connected respectively to two of the three members of said differential gear, a transfer mechanism connected to the third member of said differential gear, means for relatively shifting said amount setting members and said wheels to selectively couple one or the other of said wheels to said amount setting members according to whether amounts are being entered or totals taken, and means for holding that member of said differential gear which is connected to said transfer mechanism stationary at all times except when a transfer is taking place.

The foregoing specification signed at Cologne, Germany, this 7th day of June, 1926.

BRUNO BORNKESSEL.
ERNST BREITLING.
KARL AUGUST LEHMANN.
ALEXANDER VARREN.